US010767079B2

(12) United States Patent
Bordoloi et al.

(10) Patent No.: US 10,767,079 B2
(45) Date of Patent: *Sep. 8, 2020

(54) ICE-PHOBIC COATING FORMULATIONS AND USES THEREOF

(71) Applicant: Ames Rubber Corporation, Hamburg, NJ (US)

(72) Inventors: Binoy K. Bordoloi, Bridgewater, NJ (US); Allen L. Moorefield, Franklin, NJ (US); Ronald W. Brush, Ringwood, NJ (US); Donald C. Conner, Jr., Milford, PA (US); Alexander M. Alazraki, Jr., Sussex, NJ (US)

(73) Assignee: AMES RUBBER CORPORATION, Hamburg, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,568

(22) Filed: Dec. 13, 2018

(65) Prior Publication Data

US 2019/0106594 A1  Apr. 11, 2019

Related U.S. Application Data

(60) Continuation of application No. 15/282,311, filed on Sep. 30, 2016, now Pat. No. 10,167,413, which is a
(Continued)

(51) Int. Cl.
C09D 183/06 (2006.01)
C08K 5/41 (2006.01)
(Continued)

(52) U.S. Cl.
CPC ............. *C09D 183/06* (2013.01); *B05D 1/02* (2013.01); *C08K 5/053* (2013.01); *C08K 5/41* (2013.01); *C08L 83/04* (2013.01); *C09D 7/61* (2018.01); *C09D 7/65* (2018.01); *C09D 7/67* (2018.01); *C09D 7/68* (2018.01); *C09D 7/69* (2018.01); *C09D 127/12* (2013.01); *C09D 183/04* (2013.01); *C09D 183/08* (2013.01); (Continued)

(58) Field of Classification Search
CPC ........................... C09D 183/04; C09D 183/06
See application file for complete search history.

(56) References Cited

U.S. PATENT DOCUMENTS 4,490,500 A  12/1984 Smith
4,588,770 A  5/1986 Wurminghausen et al.
(Continued)

FOREIGN PATENT DOCUMENTS

CN  102382536  3/2012
CN  102702881  10/2012
(Continued)

OTHER PUBLICATIONS

Halford, B., "Putting the Freeze on Ice Crystal Growth", ACS Chemical & Engineering News, Oct. 6, 2014: 42-43.
(Continued)

*Primary Examiner* — Liam J Heincer
(74) *Attorney, Agent, or Firm* — Lowenstein Sandler LLP

(57) ABSTRACT

Disclosed in certain embodiments is an ice-phobic coating formulation comprising an elastomer, filler particles, and a cryoprotectant.

18 Claims, 11 Drawing Sheets

Related U.S. Application Data division of application No. 14/697,450, filed on Apr. 27, 2015, now abandoned.

(60) Provisional application No. 62/096,505, filed on Dec. 23, 2014, provisional application No. 61/985,125, filed on Apr. 28, 2014.

(51) Int. Cl.

| | | |
|---|---|---|
| C08K 5/053 | (2006.01) | |
| C09D 7/40 | (2018.01) | |
| C09D 7/65 | (2018.01) | |
| C09D 7/61 | (2018.01) | |
| C09D 183/04 | (2006.01) | |
| C08L 83/04 | (2006.01) | |
| C09D 127/12 | (2006.01) | |
| B05D 1/02 | (2006.01) | |
| C09D 183/08 | (2006.01) | |
| C08K 3/26 | (2006.01) | |
| C08G 77/12 | (2006.01) | |
| C08G 77/20 | (2006.01) | |
| C08K 3/04 | (2006.01) | |
| C08K 3/22 | (2006.01) | |
| C08K 5/1545 | (2006.01) | |
| C08K 5/42 | (2006.01) | |

(52) U.S. Cl.
CPC ............ *C08G 77/12* (2013.01); *C08G 77/20* (2013.01); *C08K 3/04* (2013.01); *C08K 3/042* (2017.05); *C08K 3/22* (2013.01); *C08K 5/1545* (2013.01); *C08K 5/42* (2013.01); *C08K 2003/2241* (2013.01); *C08K 2003/265* (2013.01); *C08L 2205/02* (2013.01)

(56) References Cited

U.S. PATENT DOCUMENTS

| | | | |
|---|---|---|---|
| 4,761,312 A | 8/1988 | Koshi et al. | |
| 4,780,338 A | 10/1988 | Saad et al. | |
| 4,929,703 A | 5/1990 | Narula et al. | |
| 5,158,573 A | 10/1992 | Berg | |
| 5,356,980 A | 10/1994 | Feder et al. | |
| 5,432,006 A | 7/1995 | Kessel et al. | |
| 5,445,873 A | 8/1995 | Yaginuma et al. | |
| 5,516,868 A | 5/1996 | Yamazaki et al. | |
| 5,534,609 A | 7/1996 | Lewis et al. | |
| 5,597,584 A | 1/1997 | Bhatt et al. | |
| 5,663,215 A | 9/1997 | Milligan | |
| 5,705,587 A | 1/1998 | Hatanaka et al. | |
| 5,708,075 A | 1/1998 | Chung et al. | |
| 5,756,598 A | 5/1998 | Chung et al. | |
| 5,789,084 A | 8/1998 | Nakamura et al. | |
| 5,905,131 A | 5/1999 | Joseph | |
| 6,008,310 A | 12/1999 | Itoh et al. | |
| 6,124,407 A | 9/2000 | Lee | |
| 6,369,184 B1 | 4/2002 | Bohin | |
| 6,387,520 B1 | 5/2002 | Fujiki et al. | |
| 6,437,039 B1 | 8/2002 | Ahmed et al. | |
| 6,451,437 B1 | 9/2002 | Amidaiji | |
| 6,482,888 B1 | 11/2002 | Ahn et al. | |
| 6,586,535 B1 | 7/2003 | Clark et al. | |
| 6,833,407 B1 | 12/2004 | Ahmed et al. | |
| 8,912,302 B2 | 12/2014 | Miyamoto et al. | |
| 10,167,413 B2 * | 1/2019 | Bordoloi | C09D 7/69 |
| 2002/0123569 A1 | 9/2002 | Koyama et al. | |
| 2003/0013802 A1 | 1/2003 | Ahn et al. | |
| 2003/0035965 A1 | 2/2003 | Irifune et al. | |
| 2003/0130363 A1 | 7/2003 | Meguriya | |
| 2003/0180468 A1 | 9/2003 | Cray et al. | |
| 2004/0082736 A1 | 4/2004 | Sakamoto et al. | |
| 2005/0129963 A1 | 6/2005 | Radl et al. | |
| 2006/0128921 A1 | 6/2006 | Cray et al. | |
| 2007/0167563 A1 | 7/2007 | Cray et al. | |
| 2007/0224141 A1 | 9/2007 | Themens et al. | |
| 2007/0248550 A1 | 10/2007 | Patel et al. | |
| 2009/0082498 A1 | 3/2009 | Kimura | |
| 2010/0203096 A1 | 8/2010 | Tanaka et al. | |
| 2010/0203097 A1 | 8/2010 | Tanaka | |
| 2010/0255205 A1 | 10/2010 | Cray et al. | |
| 2010/0282410 A1 | 11/2010 | Pouchelon et al. | |
| 2011/0274935 A1 | 1/2011 | Yamamoto | |
| 2011/0118378 A1 | 5/2011 | Bublewitz et al. | |
| 2011/0150800 A1 | 6/2011 | Dumousseaux et al. | |
| 2011/0251339 A1 | 10/2011 | Yamaguchi et al. | |
| 2011/0287267 A1 | 11/2011 | Hori et al. | |
| 2013/0065999 A1 | 3/2013 | Takanashi | |
| 2013/0071591 A1 | 3/2013 | Yamamoto et al. | |
| 2014/0127516 A1 | 5/2014 | Wang et al. | |
| 2014/0206832 A1 | 7/2014 | Martens et al. | |
| 2014/0235806 A1 | 8/2014 | Miyamoto et al. | |
| 2014/0242312 A1 | 8/2014 | Murai et al. | |
| 2014/0272435 A1 | 9/2014 | Dershem | |
| 2014/0342166 A1 | 11/2014 | Yang et al. | |
| 2014/0370063 A1 | 12/2014 | Lorant | |
| 2015/0018455 A1 | 1/2015 | Nachtman et al. | |
| 2015/0225577 A1 | 8/2015 | Tanaka et al. | |
| 2015/0238408 A1 | 8/2015 | Mateu et al. | |
| 2015/0259450 A1 | 9/2015 | Corveleyn et al. | |
| 2015/0274971 A1 | 10/2015 | Endo et al. | |
| 2015/0337115 A1 | 11/2015 | Maliverney et al. | |
| 2016/0009971 A1 | 1/2016 | Wang et al. | |
| 2016/0089312 A1 | 3/2016 | Dique-Mouton et al. | |

FOREIGN PATENT DOCUMENTS

| | | |
|---|---|---|
| DE | 10155716 | 5/2003 |
| WO | 2008084747 | 7/2008 |

OTHER PUBLICATIONS

Bordoloi, B. K., and Moorefield, A. L., "Strategy for Solventless Silicone Coating System", Rubber & Plastics News, Aug. 25, 2014.

Zhao, X. D., et al, Chapter 9, "Superhydrophobic Surfaces—Beyond Lotus Effect", 2012 Springer Science+Business Media, p. 332.

Hanson, D. C., Han, Y. H, and Baeza, J. A., "Super-Hydrophobic Materials for Aircraft Ice Protection", SAMPE Conference Proceedings, Seatle, WA, Jun. 2-5, 2014, Society for the Advancement of Material and Process Engineering.

Xiu, Y. et al. "Superhydrophobic Silicon/PTFE Films for Biocompatible Application in Encapsulation of Implantable Microelectronics Devices", IEEE, 2006 Electronic Components and Technology Conference, pp. 686-692.

Flores-Vivian, I. et a. "Self-Assembling Particle-Siloxane Coatings for Superhydrophobic Concrete" ACS Applied Materials & Interfaces, 2013, American Chemical Society, pp. 13284-13294.

\* cited by examiner

ICE-PHOBIC COATING FORMULATIONS AND USES THEREOF

CROSS-REFERENCE TO RELATED APPLICATIONS

This application is a continuation application of U.S. Non-Provisional patent application Ser. No. 15/282,311, filed Sep. 30, 2016, which is a divisional application of U.S. Non-Provisional patent application Ser. No. 14/697,450, filed Apr. 27, 2015, which claims the benefit of priority of U.S. Provisional Patent Application No. 61/985,125, filed Apr. 28, 2014, and U.S. Provisional Patent Application No. 62/096,505, filed Dec. 23, 2014, all of which are hereby incorporated by reference herein in their entireties.

TECHNICAL FIELD

Embodiments of the invention relate generally to coating systems and, more specifically, to ice-phobic coating formulations.

BACKGROUND

There is a global trend towards eliminating hydrocarbon solvents in various high volume coating applications of polymeric systems. Alternative systems that are free of volatile organic compounds (VOCs) have utilized, for example, fluorinated solvents, which address some of issues associated with hydrocarbon solvents, such as flammability and volatility. However, fluorinated solvents (e.g., containing fluorinated ethers, fluorinated olefins, etc.) give rise to their own set of concerns, such as ozone depletion potential and high global warming potential (GWP). Moreover, fluorinated solvents tend to be significantly more expensive than hydrocarbon solvents.

Thus, there exists a need in the art for coating systems that are safer for use, more environmentally-friendly, less expensive, and are capable of meeting end-use performance requirements.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
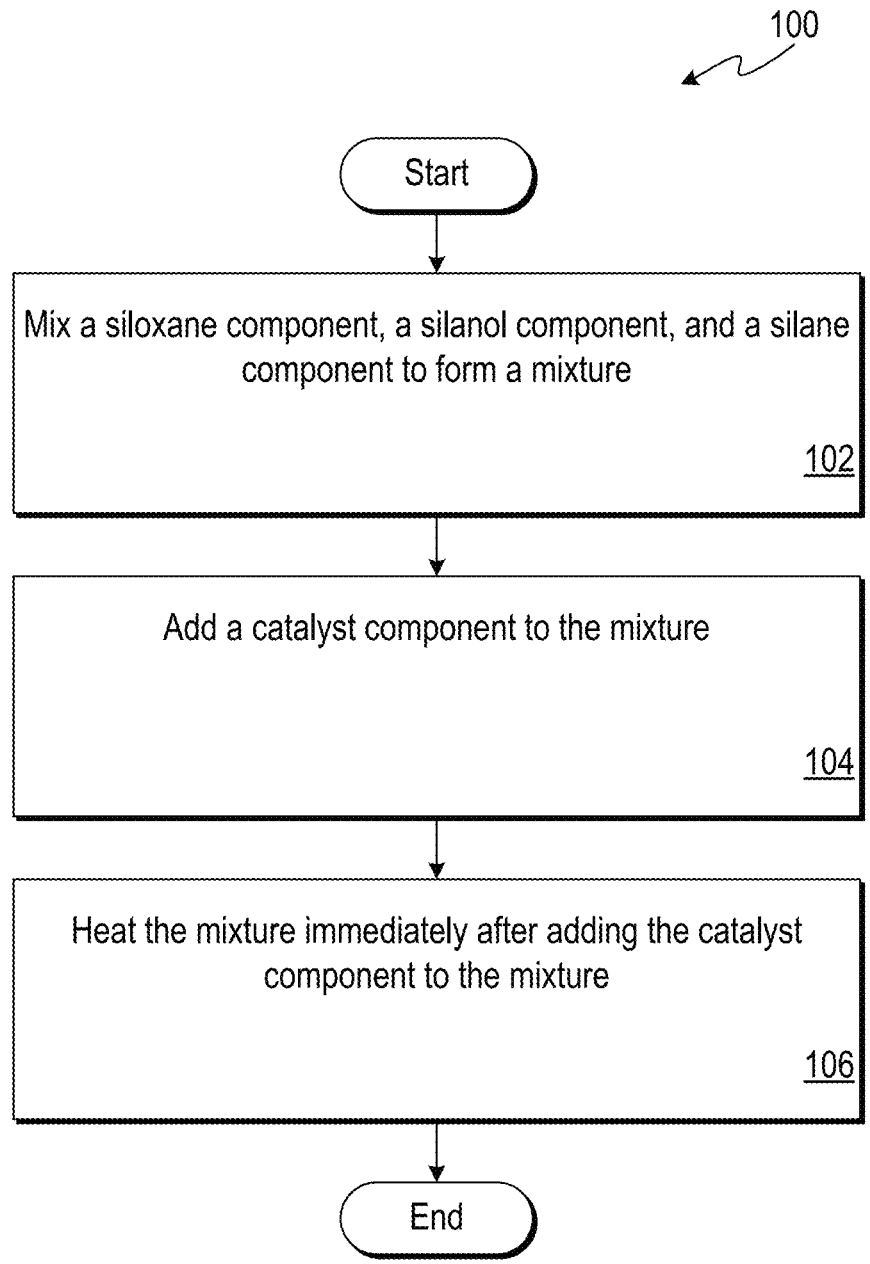
FIG. 1 is a block diagram illustrating a method for preparing a solventless curable coating formulating according to an embodiment of the disclosure.

Disclosed herein are embodiments of curable coating systems and uses thereof. The embodiments described herein allow for the curable silicone coating system to be prepared over a wide range of coating viscosities. Moreover, such systems eliminate the need for any solvents, such as VOC solvents.

Solventless condensation cure systems are advantageous as they enable moisture-based curing at room temperature for thin coating layers. While certain embodiments are described with respect to condensation cure systems, the embodiments are compatible with other systems as well, including addition cure systems and UV cure systems (in which a catalytic curing reaction is activated by UV exposure). Curing may be expedited rapidly for these systems by application of heat.

Certain embodiments are also directed to curable formulations for producing ice-phobic coatings. Ice-phobic coatings play an important role in the aerospace industry. For example, propellers and other components of an aircraft engine utilize coatings based on low surface energy materials to impart hydrophobic properties to the components. Water forms high contact angle droplets on hydrophobic surfaces which can allow a droplet to roll off the surface easily due to the small contact area between the droplet and the surface. However, the dynamics of solid ice formation are more complex than those of water on such surfaces. For example, various factors contribute to the sizes and shapes of ice formations. Moreover, surface roughness of the coating is believed to promote ice adhesion.

The embodiments described herein help to reduce ice adhesion by incorporating low surface energy materials (e.g., hydrophobic elastomers), cryoprotectants, and filler particles into curable coating formulations. Cryoprotectants, such as glycerol, help to reduce ice adhesion failure stress (which relates to an amount of force required to dislodge ice from a surface) compared to coatings without a cryoprotectant. Filler particles improve the durability and erosion resistance of the coatings. In certain embodiments, low loading of filler particles imparts durability while maintaining surface smoothness so as to avoid increasing ice adhesion potential. Embodiments of ice-phobic coating formulations may be based on solventless systems as well as solvent-based systems.

The present invention has been described with reference to specific exemplary embodiments thereof. It will, however, be evident that various modifications and changes may be made thereto without departing from the broader scope of the embodiments of the invention as set for in the appended claims. The specification and drawings are, accordingly, to be regarded in an illustrative rather than a restrictive sense.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

As used herein, the term "solventless" refers to a chemical system free of or substantially free of a solvent, such that a total weight percent of solids is at or near 100 wt %.

As used herein, a system that is "substantially free of" a component means that the component, if present in the system, is present below a detectable amount or is present in an amount to having no statistically significant effect on the system (e.g., less than 0.01 ppm).

As used herein, the term "room temperature" or "RT" refers to a temperature ranging from 20° C. to about 25° C.

As used herein, when referring to particles, the term "surface area" refers to a maximum molecularly accessible surface area of a material.

The term "particles" when referring materials used as fillers refers to particulate materials ranging in diameter from 1 nm to 1 mm. The morphology of the particles may be crystalline, semi-crystalline, or amorphous, as well as aggregates of smaller particles. Unless stated otherwise, a particle "size" is an average diameter of an ensemble of like particles in which a spherical shape is assumed. In the case of non-spherical particles, such as nanorods or nanotubes, the particle "size" refers to an average value of a largest dimension of like particles. Also, as used herein, the term "nanoparticle" refers to any particle having a maximum dimension less than 1 micrometer (μm), and the term "microparticle" refers to any particle having a minimum dimension greater than or equal to 1 μm.

As used herein, "failure stress" is defined as a maximum or peak value of stress from a load-displacement profile curve. For example, ice adhesion failure stress refers to a maximum stress/load applied to dislodge ice from a surface of a coating.

In the embodiments described herein, solventless systems of coatable viscosity may be formulated for each of the three types of systems: condensation systems, addition systems, and ultra-violet (UV) cure systems. Each of these systems can be adapted for meeting end-use requirements (e.g., viscosity, shelf-life, etc.) by adjusting various formulation parameters. The embodiments described herein are not limited to coating systems, but can be extended to non-coating applications as well, including, but not limited to, casting, liquid injection molding (LIM), or other molding operations.

In certain embodiments, a condensation cure system includes a siloxane component, a silanol component, a silane component, and a catalyst component.

The siloxane component may include, for example, one or more siloxanes having a wide range of molecular weights and viscosities (e.g., siloxanes available from DOW CORNING, BLUESTAR SILICONES, and GELEST). As an example, a suitable siloxane component may include trimethylsiloxy-terminated polydimethylsiloxanes (PDMS) having viscosities ranging from 1 cSt to 20,000,000 cSt.

The silanol component may include, for example, one or more silanol-terminated polydimethylsiloxanes having a wide range of molecular weights. As an example, silanols in a viscosity range from 10 cSt to 100,000 cSt (e.g., silanols available from GELEST). As another example, a suitable silanol may be DMS-S31 (available from GELEST) having an average molecular weight of about 26,000 g/mol and a viscosity of about 1,000 cSt. As another example, a suitable silanol may be DMS-32 (GELEST) having an average molecular weight of about 36,000 g/mol and a viscosity of about 2,000 cSt.

The silane component may include, for example, one or more methoxy-, ethoxy-, or acetoxy-silanes (e.g., silanes available from MOMENTIVE and GELEST). As an example, a suitable tri-functional type of silane may be 3-aminopropyltriethoxysilane having a viscosity of about 2 cSt. As another example, a suitable tetra-functional type of silane may include tetraethoxysilane (also known as tetraethoxy-orthosilicate).

The catalyst component may include, for example, tin (II) octoate as a catalyst (e.g., available from SIGMA-ALDRICH). A concentrated solution of catalyst may be prepared in the siloxane component discussed above.

In certain embodiments, an addition cure system includes a base polymer component, a cross-linking component, and a catalyst component.

The base polymer component may include, for example, vinyl-siloxane (e.g., vinyl-terminated PDMS). As another example, a suitable base polymer component may be DMS-V41 (available from GELEST), which is a vinyl-terminated PDMS.

The cross-linking component may include, for example, methylhydrosiloxane-dimethylsiloxane co-polymer having methylhydrosiloxane content. Molar equivalents of hydrides react with vinyls of vinyl-terminated PDMS to produce a cross-linked network. In one example, a suitable cross-linking component may be HMS-301 (available from GELEST), which is a methylhydrosiloxane-dimethylsiloxane co-polymer.

The catalyst component may include, for example, a platinum complex solution. As an example, the catalyst component may be SIP 6830.3 (available from GELEST), which is a platinum-divinyltetramethyl-disiloxane complex in vinyl-terminated PDMS.

In some embodiments, the addition cure system may be formulated as a Part-A and Part-B system, with Part-A corresponding to vinyl-terminated PDMS and a platinum catalyst, and Part-B corresponding to a hydride-functionalized PDMS. As an example, LR 3003-20 (available from WACKER) is an example of a Part-A and Part-B system, which may be used in a liquid injection molding process typical system used in LIM system. Such systems may also be formulated with treated silica.

In certain embodiments, a UV cure system includes a catalyst component that is activated upon exposure to UV light. UV cure systems are available, for example, from MOVENTIVE. In some embodiments, a UV system is used for applying a thick coating to a substrate.

Examples of each system are provided below. Coating formulations for the systems were prepared using various pieces of equipment. A homogenizer (L5M-A High Shear Mixer available from SILVERSON MACHINES, INC.) was used for blending high viscosity silanol or vinyl-siloxane with PDMS to form a uniform solution. Reactive blends were also mixed initially using the homogenizer. An analyzer (Rubber Process Analyzer (RPA) 2000, Serial No. 90 AID 2045, available from ALPHA TECHNOLOGIES, INC.) was used for analyzing rubber cure profiles by obtaining rheological measurements as a function of time and temperature. A viscometer (available from BROOKFIELD ENGINEERING) was used to perform viscosity measurements. It is noted that other equipment may be used to realize the embodiments described herein, as would be appreciated by one of ordinary skill in the art. An optical measuring system (Avant Optical Measuring System, Model 600, OPTICAL GAGING PRODUCTS) was used to measure coating thicknesses before and after erosion tests.

FIG. 1 is a block diagram illustrating a method 100 for preparing a curable coating formulation according to an embodiment of the disclosure.

At block 102, a siloxane component, a silanol component, and a silane component are mixed together to form a mixture (e.g., using a homogenizer). At block 104, a catalyst component is added to the mixture (e.g., tin (II) octoate), forming a curable coating formulation.

At block 106, the mixture is heated immediately (e.g., within 10 minutes) after adding the catalyst component to the mixture. In one embodiment, concentrations of each of the silanol component, the silane component, and the catalyst component are adjusted based on the siloxane component.

An exemplary addition cure formulation was prepared using the following components: vinyl-terminated siloxane (DMS-V41) of equivalent weight 31,350 g/mol as the Part-A component; hydride-siloxane (HMS-301) of equivalent weight 245 g/mol; platinum catalyst SIP 6830.3; and siloxane. Formulations were prepared by placing siloxane in a container, adding vinyl-siloxane to the container, and mixing with a homogenizer. Hydride-siloxane was then added to the mixture, and the mixture was mixed again with the homogenizer. A platinum catalyst solution was added to the container and additional mixing was performed.

In some embodiments, a very thick coating may be made by casting, injection molding, transfer molding, or LIM, and may be produced using the addition cure system. As an example, a Part-A formulation contained vinyl-capped-siloxane polymer, quartz filler, calcium carbonate, and platinum catalyst, which had a viscosity 153,000 cSt. Part-B formulation contained vinyl-capped-siloxane polymer, hydride cross-linker, and blue pigment, which had a viscosity of 6,000 cSt. A mix ratio of Part-A to Part-B was 10 to 1. A particular application utilized a compliant rubber sheet that would demonstrate release characteristics of ink for printing onto glass and ceramics, and a formulation was selected that yielded a heat-cured sheet of having a Shore A hardness of 25±5. The sheet demonstrated a specific gravity of 1.16, a tensile strength of 427 psi, and elongation at break of 280%.

To demonstrate mechanical performance and ink-transfer capability, flowable liquid formulations were prepared using PDMS and a two-component platinum cure system. In these formulations, the Part-A component included vinyl-siloxane and platinum catalyst along with an appropriate level of filler, and the Part-B component included vinyl-siloxane and hydride-siloxane cross-linker along with an appropriate level of filler. PDMS was mixed with the Part-A component first as this was the higher viscosity component, followed by adding the Part-B component to yield a Part-A to Part-B ratio of about 10 to 1. This formulation strategy provided a readily mixable and flowable system, which could be pumped into a flat mold of desired membrane thickness or spin-cast into a sheet of desired thickness. Cured membranes were obtained after heating at 220° F. for 75 minutes.

Table 1 summarizes the parameters and mechanical performance results for three two-component systems (Samples A-C). Results for liquid silicone rubber (LSR) membranes (Samples D-F) are shown for comparative purposes. Samples A-C were each about 55 mil in thickness. Two levels of PDMS oil from about 27% to 39% were evaluated, which provided adequate mechanical performance for ink transfer to a substrate during which the membranes underwent repeated large scale deformations of about 100% elongation. Mold surface preparation determined the roughness of the surface produced, which was evaluated by atomic force microscopy. A rougher surface resulted in a larger amount of ink pick-up for subsequent transfer to the substrate.

TABLE 1

Membrane and ink transfer test results

| Composition (wt %) | Sample A | Sample B | Sample C | Sample D | Sample E | Sample F |
|---|---|---|---|---|---|---|
| Part-A | 68.5 | 55.6 | 68.5 | LSR | LSR | LSR |
| Part-B | 4.1 | 5.6 | 4.1 | for | For LIM | for |
| PDMS(100) | 27.4 | — | — | LIM | No Oil | LIM |
| PDMS(50) | — | 38.8 | 27.4 | No Oil | | No Oil |
| Sp. Gravity | 1.16 | 1.12 | 1.17 | 1.12 | 1.11 | 1.09 |
| Shore A Hardness | 25 | 19 | 23 | 22 | 36 | 20 |
| Tensile Strength (psi) | 427 | 313 | 420 | 1117 | 1109 | 939 |
| Elongation (%) | 280 | 208 | 239 | 893 | 614 | 905 |
| Modulus100 (psi) | 188 | 175 | 204 | 70 | 104 | 52 |
| Tear B (lbs/in) | 53 | 39 | 53 | 283 | 100 | 121 |
| Thickness (mil) | 58 ± 5 | 55 ± 3 | 58 ± 5 | | | |
| Ink Transfer | Suitable | Suitable | Suitable | — | Suitable | — |
| AFM Roughness (Ra) | 117 ± 41 | 87 ± 20 | — | | | |

An exemplary UV cure system included SILOPREN UV Electro 225-1 Base (viscosity of 70,000 cSt), which is a colorless or translucent system including polyvinyl siloxane, dimethyl-hydrogen-polysiloxane and silica. The UV cure system further included SILOPREN UV Electro 225-1 Catalyst (viscosity 10,000 cSt), which is a colorless or translucent system including platinum catalyst and polyvinyl siloxane. A UV light source (UV LED SLM™, PHOSEON TECHNOLOGY) was used to irradiate the system at a power of 480 W, a peak irradiance of 8 W/cm$^2$ at 395 nm and 4 W/cm$^2$ at 365 nm.

This system was similar to the addition cure systems described above, except that the platinum catalyst was generated in response to UV irradiation. Material transparency may be adjusted to allow light to pass through for a more effective UV cure.

The above system of Silopren UV Electro 225-1 at a Base to Catalyst ratio of 98 to 2 was cured readily in a casting mold by exposure to UV light for about 8 minutes to about 10 minutes. A sheet was obtained having a thickness of 2 mm. The cured silicone elastomer sheet showed a Shore A hardness of 23, a tensile strength of 592 psi, and an elongation at break of 674%.

Other UV cure systems, such as NUVA-SIL 5031, utilize a single component dual cure silicone, where UV/visible light and moisture curing can be utilized for the same formulation. In such systems, UV curing occurs due to acrylic functionality and moisture curing occurs due to tin(II) catalyzed acetoxy silane.

In certain embodiments that contained additional filler materials, silica, for example, appeared to have no adverse effect on UV curing, while dark colored filler materials, such as graphite, resulted in skin-curing with limited curing depth through the coating. Indium tin oxide (or tin-doped indium oxide) is one of the most widely used transparent conductive oxides. Embodiments that utilized indium tin oxide allowed for electrical and thermal conductivity and provided optical transparency that facilitated UV curing. Filler materials, such as nanoparticle fillers, are often to impart beneficial properties to the coatings while provide transparency or translucency during curing due to their small sizes. It is noted that condensation and addition cure systems have no associated restrictions regarding transparency or translucency.

Embodiments of Ice-Phobic Coating Formulations

Certain embodiments of the disclosure relate to ice-phobic coating formulations. Such formulations include low surface energy elastomers including, but not limited to, silicones, fluoro-silicones, and fluoro-elastomers. Embodiments of ice-phobic coating formulations for producing ice-phobic coatings that exhibit advantageous ice adhesion resistance include silicone, nanoparticle fillers, and a cryoprotectant. Moreover, such embodiments may be based on solventless systems or systems utilizing solvents (e.g., non-VOC solvents).

In certain embodiments, ice-phobic coating formulations include filler particles of various compositions, sizes, and morphologies. Silicone-based formulations that include filler particles at 10 wt % to 30 wt % demonstrated high ice adhesion (quantified as ice adhesion failure stress measured using an "ice-pin test" discussed below), while formulations having less filler particles led to coatings with superior ice-phobicity (e.g., lower ice adhesion). Filler particles may be included in coating formulations to provide reinforcement and increase erosion resistance of the resulting coating. In some embodiments, nanoparticle fillers, such as surface-treated silica nanoparticles, are effective for these purposes at lower loading amounts.

In some embodiments, the coating formulations include a cryoprotectant, such as glycerol. As an example, a silicone-based formulation containing glycerol at 1 wt % to 3 wt % and silica nanoparticles resulted in low ice adhesion. As another example, a formulation containing glycerol at 1 wt % to 3 wt % and silica nanoparticles at 3 wt % resulted in a coating having the lowest ice adhesion compared to unfilled or silica nanoparticle-filled coatings, and exhibited acceptable erosion resistance. As another example, polytetrafluoroethylene (PTFE) nanoparticles, graphene nanoparticles, and micrometer-scale polypropylene particles at low loading (e.g., about 3 w %) demonstrated low ice adhesion. At high loading (e.g., 33 wt % or greater) of PTFE nanoparticles, the resulting coating demonstrated significantly higher ice adhesion failure stress.

In some embodiments, ice-phobic coating formulations are applied in a liquid state to a solid surface, for example, by spraying or other suitable techniques. In some embodiments, the formulations may be solvent-based or solventless, and the viscosity may be selected to facilitate spraying to achieve a desired coating thickness. For solvent-based formulations, suitable solvents may include VOC solvents and/or non-VOC solvents, which may be used to disperse the formulations. In some embodiments, formulations may be prepared in accordance with any of the condensation, addition, or UV cure systems described herein.

In some embodiments, the elastomer includes one or more of fluoro-elastomer, fluoro rubber of polymethylene type (e.g., having all substituent fluoro and perfluoroalkyl or perfluoroalkoxy groups on the polymer chain), fluoro-silicone (e.g., pre-formulated with silica filler particles), or silicone (polysiloxane). In some embodiments, the elastomer is further formulated with fillers, curatives, and other additives.

In some embodiments, the ice-phobic coating formulation was deposited on a surface treated with a primer, such as a silane-based primer that was moisture cured on the surface. Examples of primers include, but are not limited to, CHEM-LOK® 608 (available from LORD CORPORATION), SP-270 (available from NUSIL TECHNOLOGY LLC) and PR-1200 (available from DOW CORNING).

In some embodiments, fillers include filler particles, such as silica particles, polypropylene (PP) particles, polytetrafluoroethylene (PTFE) particles, and graphene particles. Silica particles may include silica particles having their surfaces treated with dimethyl -dichlorosilane ("fumed silica"). In some embodiments, the filler particles have an average size ranging from 5 nm to 20 nm (e.g., 17 nm nanoparticles). In some embodiments, filler particles may form aggregates having an average diameter ranging from 100 nm to 300 nm, and greater than 500 nm in some embodiments. Examples of filler particles include micronized polypropylene (MICROPRO 400, MICRO POWDERS, INC.) having an average diameter of about 6 μm, PTFE nanoparticles (nanoFLON® 114T, SHAMROCK INDUSTRIES) having an average diameter of about 200 nm and a surface area of 6 to 8 $m^2/g$, and graphene particles (xGnP® C-500, XG SCIENCES, INC.) having an average thickness ranging from 1 nm to 5 nm with an average surface area ranging from 300 $m^2/g$ to 750 $m^2/g$. Other types of filler particles include calcium carbonate, titanium dioxide, indium tin oxide, or any other suitable particle for dispersing within a coating formulation.

In some embodiments, a cryprotectant is included. Cryoprotectants are well recognized for their use in cryo-preservation of tissue, cells, and blood-based systems to increase shelf-life under freezing conditions. Their mechanism of action includes lowering of ice melting temperature and/or reducing the size of ice crystals. Without cryoprotectants, the formation of large ice crystals can cause damage to cell membranes. Examples of cryoprotectants include, but are not limited to, glycerol, trehalose, dimethylsulfoxide (DMSO), and polyvinyl alcohol (PVA). Any other material capable of reducing melting temperature and/or reducing the size of ice crystals formed may be utilized as a cryoprotectant. Without being bound by theory, it was hypothesized that a suitable cryoprotectant used in an ice-phobic coating formulation could reduce the size of ice crystals formed on the surface of the resulting coating, and thus reduce the overall adhesion of ice to the coating.

Illustrative Examples of Ice-Phobic Coating Formulations

Various sample formulations were investigated for their use in ice-phobic coatings, which are summarized in Table 2. Variations of these samples were also characterized. The samples included various low surface energy polymers, such as fluoro-elastomer, fluoro-silicone, and silicone, had different cure mechanisms, and included varying levels of fillers. Some of the samples were solvated in traditional VOC solvents or a non-VOC solvent, and one sample (Sample 6) was a solventless system. Viscosities of the samples were evaluated at 20 wt % solids with the exception of solventless Sample 6, which was at 100 wt % solids by definition. Viscosities varied depending on the molecular weight of the polymer and filler content in the formulation. The samples were subsequently diluted at varying levels to arrive at a suitable coating viscosity for spray coating (e.g., using a pneumatic spray coater), which could vary of a wide range from 100 cSt to 1500 cSt.

TABLE 2

Exemplary ice-phobic coating formulations.

| Chemistry/ Cure Type | Sample 1 silicone/ platinum cure | Sample 2 fluoro-elastomer/ bisphenol cure | Sample 3 fluoro-silicone/ peroxide cure | Sample 4 silicone/ platinum cure | Sample 5 silicone/ platinum cure | Sample 6 silicone/ platinum cure |
|---|---|---|---|---|---|---|
| Silica Filler (wt %) | 6 | 0 (metal oxides at 8) | 17 | 13 | 0 | 0 |
| Solvent Type | VOC | VOC | VOC | non-VOC | non-VOC | solventless |
| Viscosity (cSt) at 20 wt % Solids | 5,450 | 105 | 375 | 14,750 | 120 | 995 ± 145 |
| Diluted Solids Content (wt %) for Coating | 13.3 | 20.0 | 20.0 | 15.4 | 20.0 | 100.0 |
| Coating Viscosity (cSt) | 374 ± 8 | 105 | 375 | 1,320 | 120 | 850 |

Various methods were developed and used for the characterization of the example formulations, as well as their resulting coatings and ice-adhesion attributes. These methods are described in the examples to follow.

EXAMPLE 1

Water Contact Angle on Coatings

A goniometer (RAME-HART, INC.) was used for static contact angle measurements of water droplets on different coatings utilizing low surface energy materials, the results of which are summarized in Table 3. Three types of low surface energy materials were used: fluoro-silicone, silicone, and fluoro-elastomer. Fluoro-silicone resulted in the highest contact angle, silicone the next highest, and fluoro-elastomer the lowest. Coatings with and without filler particles and a coating including glycerol showed no measurable differences.

TABLE 3

Contact angle of water on low surface energy coatings on aluminum.

| | Fluoro-elastomer (with metal oxide filler) | Fluoro-silicone (with silica filler) | Silicone (without filler) | Silicone (with 3 wt % silica nanoparticles and 3 wt % glycerol) |
|---|---|---|---|---|
| N | 3 | 6 | 3 | 6 |
| Average | 81 | 97 | 91 | 92 |
| Std. Dev. | 1 | 6 | 3 | 1 |

The results indicate that while low surface energy materials may facilitate ice adhesion resistance, this effect was not sufficient to cause the water droplets to crystallize into microsphere particles when subjected to freezing conditions. Additional investigations were undertaken to evaluate ice adhesion resistance, including nanoscale surface roughness measurements, effects of fillers at low and high loadings, filler types and their sizes, and the effect of cryoprotectants. It was important that the ice-phobic coatings would show durability and erosion resistance to rain and other high velocity solid particles relevant in the aerospace industry. Thus, investigations into erosion resistance were also conducted.

EXAMPLE 2

Electron Microscopy of Nano-Dispersed Coatings

Figure 2A:
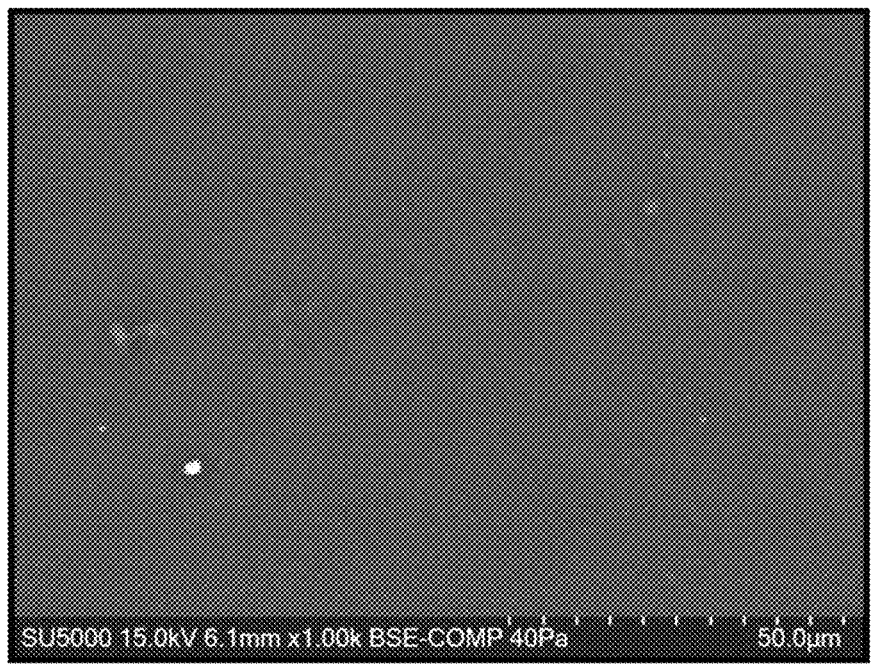
FIG. 2A is an electron micrograph of a solventless silicone-based coating without filler particles.
Figure 2B:
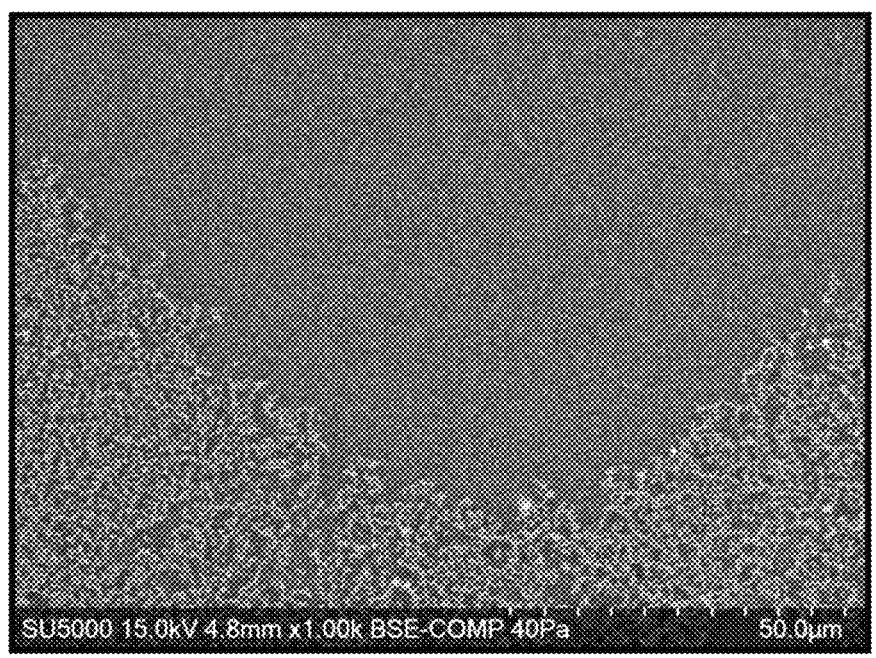
FIG. 2B is an electron micrograph of a solventless silicone-based coating with filler particles.
Figure 2C:
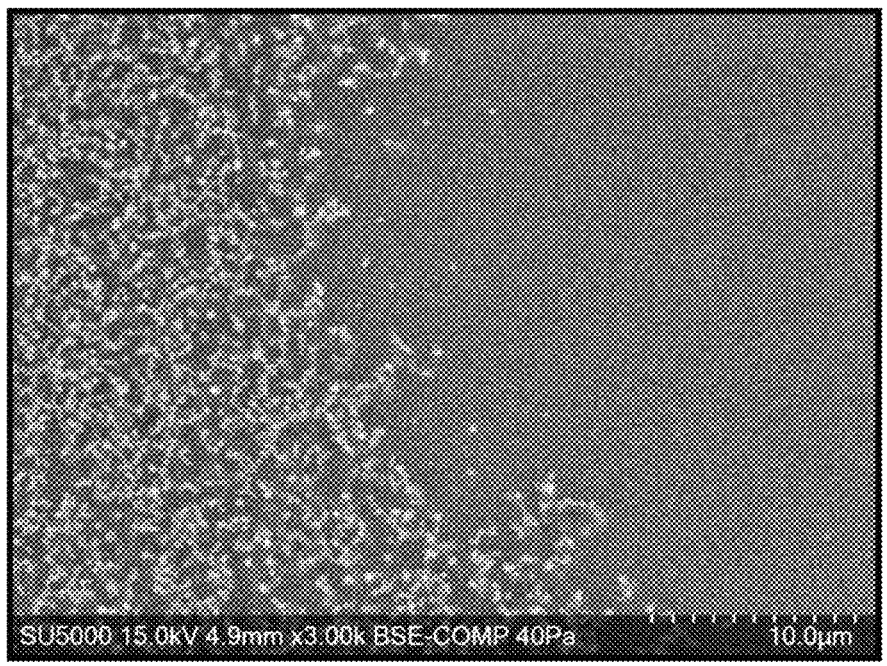
FIG. 2C is another electron micrograph of a solventless silicone-based coating with filler particles.
Figure 2D:
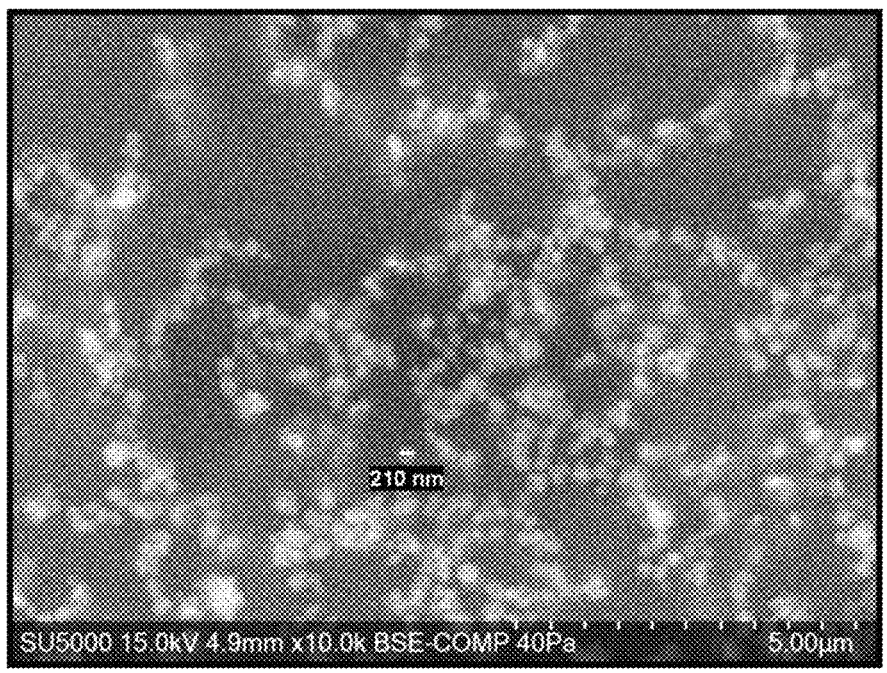
FIG. 2D is another electron micrograph of a solventless silicone-based coating with filler particles.

A field-emission scanning electron microscope (FE-SEM) was used to observe micro- and nanoscale features of resulting coatings formed according to some embodiments. FIGS. 2A and 2B show micrographs of solventless silicone-based coatings without PTFE-nanoparticles and with PTFE-nanoparticles, respectively. The coating of FIG. 2A was prepared based on the formulation of Sample 6. The debris particle artifact observed in FIG. 2A highlights the uniformity and lack of compositional differences of the coating surface. The coating of FIG. 2B was prepared based on the formulation of Sample 6 with the addition of nano-PTFE at 3 wt %, and shows a distribution of fine structure features on the surface. FIGS. 2C and 2D show higher magnification of the nanoparticle dispersion present in the coating of FIG. 2B. In general, it was observed that nanoscale fillers readily agglomerated, and thus proper dispersion using high shear homogenization was advantageous to counteract this effect.

EXAMPLE 3

Atomic Force Microscopy of Coatings on Aluminum Surfaces

An atomic force microscope (AFM) was used to observe surface roughness of resulting coatings formed according to some embodiments. In particular, surface morphology of silicone-based coatings with varying amounts of PTFE nanoparticles ("nano-PTFE") and silica nanoparticles were analyzed are summarized below in Table 4. A roughness average parameter, $R_a$, was defined as the arithmetic average of the absolute values of the profile height deviations recorded within the evaluation length and measured from the mean line. It was observed that low loading of nano-PTFE in silica-free coatings had no significant effect on $R_a$, as the data were all in a range of 2 nm to 3 nm. However, coatings containing 13 wt % silica nanoparticles had a measurably higher $R_a$ of about 7 nm regardless of any nano-PTFE content at low levels.

TABLE 4

Surface roughness for coatings with different fillers

| Filler Conditions | Measured $R_a$ (nm) |
|---|---|
| 0 wt % nano-PTFE<br>0 wt % silica nanoparticles | 2.0 |
| 1 wt % nano-PTFE<br>0 wt % silica nanoparticles | 2.7 |
| 3 wt % nano-PTFE<br>0 wt % silica nanoparticles | 3.0 |
| 0 wt % nano-PTFE<br>13 wt % silica nanoparticles | 6.9 |
| 3 wt % nano-PTFE<br>13 wt % silica nanoparticles | 7.4 |

EXAMPLE 4

Ice-Pin Push Out Test for Evaluating Ice Adhesion Resistance

Figure 3:
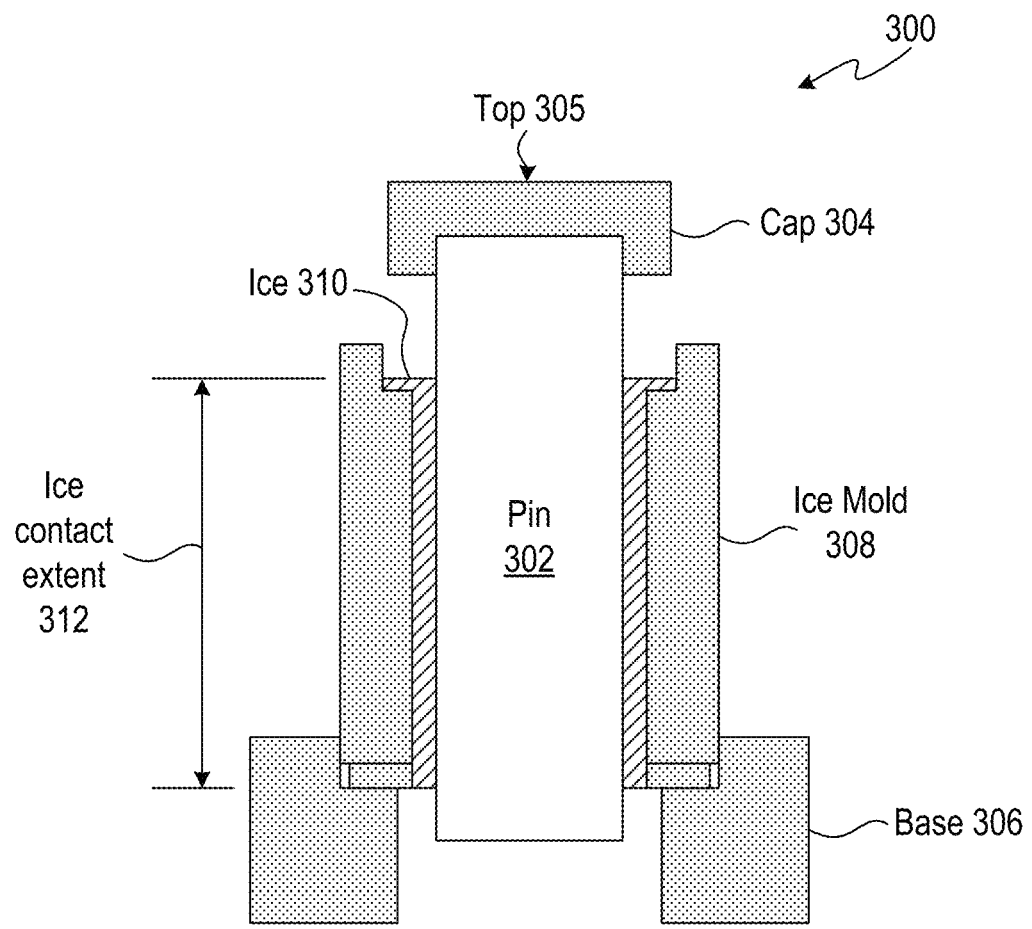
FIG. 3 is a diagram illustrating an ice-pin push out test apparatus.

The ice-pin push out test (or "ice-pin test") is a technique developed by the Department of the Army, Engineer Research and Development Center, Cold Regions Research and Engineering Laboratory (CRREL), and is used to quantify ice adhesion to various surfaces. FIG. 3 is a diagram illustrating an ice-pin push out test apparatus 300, which includes a cylindrical pin 302 disposed within an ice mold 308. Disposed on a surface of the pin 302 is a coating formed in accordance with any of the embodiments described herein. The ice mold 308 is supported on a base 306 that provides space for the pin 302 to be displaced through the ice mold 308. To prepare for testing, the ice mold 308 was filled with water with the pin 302 disposed inside and subjected to a temperature of −20° C. for at least 24 hours prior to testing to form ice 310. Measurements were then performed by applying a force to a top 305 of a cap 304 using a tensile tester at a deformation rate of 0.051 cm per minute (or 0.02 inches per minute). The lower the resistance force at the ice-pin interface, the more effective the coating was as an ice-phobic coating. Based on the surface area of the pin 302 in contact with ice 310 (defined by the pin 302 size and the ice contact extent 312), the measured failure stress was reported in units of kPa for a given coating thickness. For such measurements, the lowest thickness of coating that was prepared was 25 μm (or 1 mil) and the highest was 250 μm (or 10 mil). A Di-Metric Plus Vision Computer (OGP, INC.) was used for measuring coating thickness, which was suitable for measuring thickness on both flat and cylindrical surfaces in the micrometer range. The results ice adhesion resistance tests for various surface coatings are summarized below.

Figure 4:
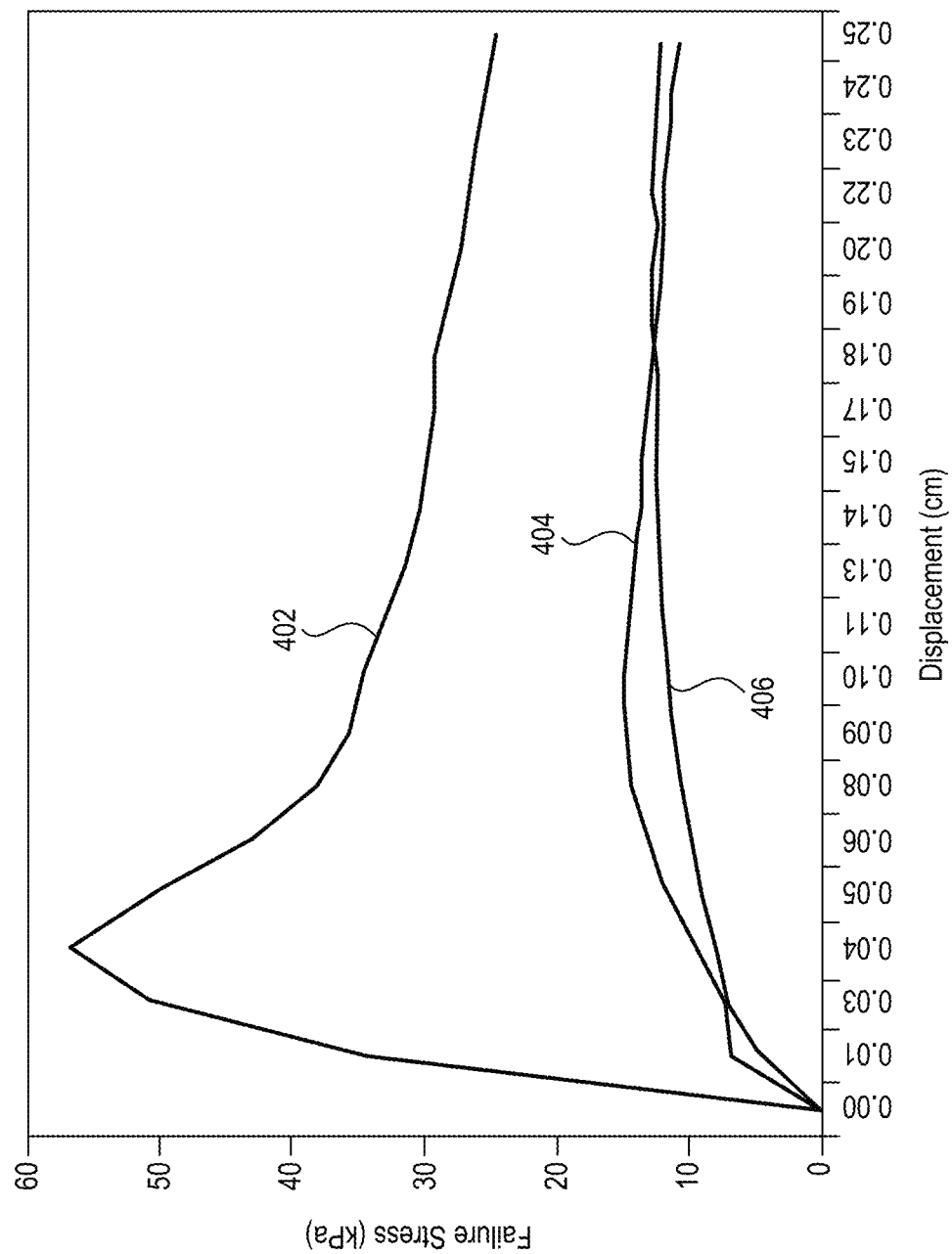
FIG. 4 shows ice adhesion load-displacement curves for coatings of different thickness according to embodiments of the present disclosure.

FIG. 4 shows ice adhesion load-displacement curves for coatings of different thickness according to embodiments of the present disclosure. Three coatings were prepared at the thicknesses of 25 μm (plot 402), 125 μm (plot 404), and 250 μm (plot 406). It was observed that higher coating thickness resulted in lower failure stress, though the effect was less pronounced at progressively higher thicknesses. In certain embodiments, coatings having thicknesses greater than 100 μm have corresponding ice adhesion failure stresses less than 20 kPa.

Figure 5A:
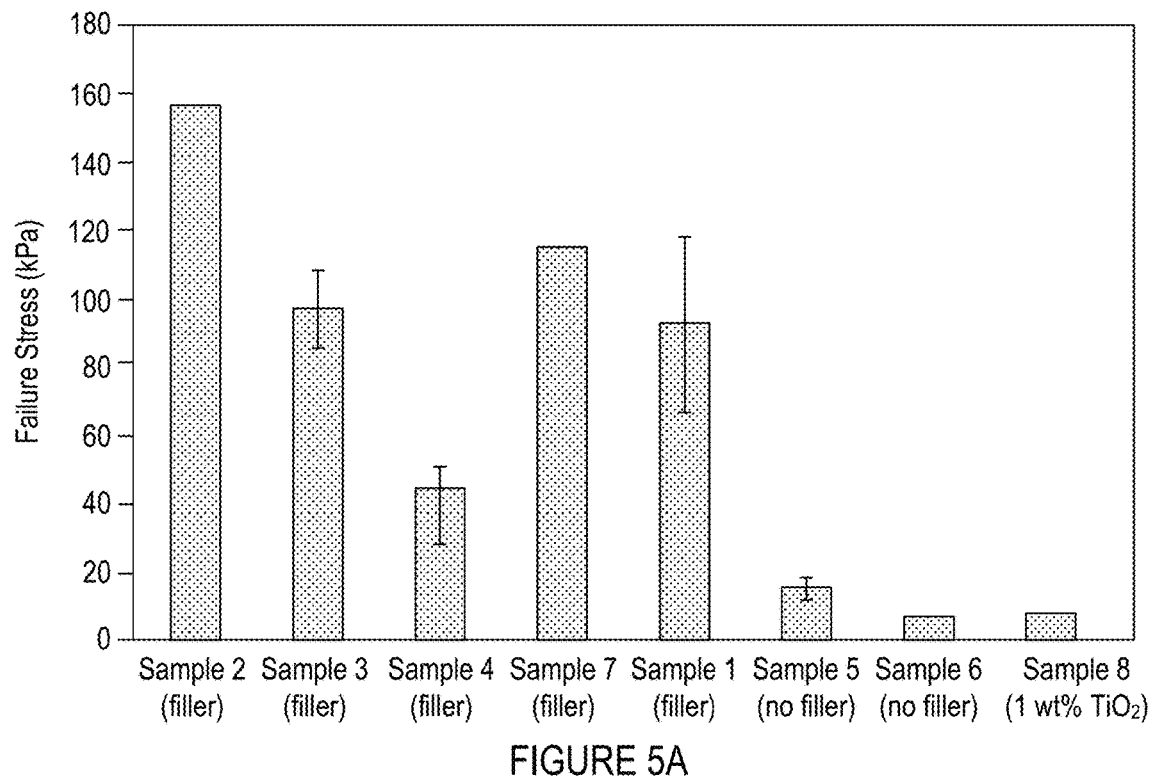
FIG. 5A shows ice adhesion failure stresses measured for various ice-phobic coatings prepared according to embodiments of the present disclosure.

FIG. 5A shows ice adhesion failure stresses measured for various ice-phobic coatings prepared according to embodiments of the present disclosure. Coatings were prepared based on the sample formulations of Table 2, with each coating having a thickness of 25 μm. It was observed that all coatings containing filler particles, which were in the range of about 6 wt % to 30 wt %, showed higher ice adhesion than those without filler particles. For example, the coating based on Example 2 (a bisphenol-cure fluoro-elastomer formulation containing about 8 wt % filler) and the coating based on Example 3 (a peroxide-cure fluoro-silicone formulation containing 17 wt % filler) demonstrated high ice adhesion. Other coatings based on filled silicones containing 6 wt % to 30 wt % traditional silica filler (Sample 4, Sample 7, and Sample 1) also demonstrated comparatively high ice adhesion. The coating formed based on Sample 5 (a filler-free platinum cure system in a non-VOC solvent), the coating based on Sample 6 (a solventless, filler-free platinum cure system), and the coating based on Sample 8 (a condensation cure system with less than 1 wt % titanium dioxide) each demonstrated low ice adhesion (e.g., ice adhesion failure stress less than 20 kPa). While the absence of filler particles resulted in the lowest ice adhesion, it is believed that filler particles help to improve erosion resistance of the coatings. Thus, certain embodiments include filler particles at suitable loading to maximize erosion resistance while minimizing any adverse effect on ice adhesion resistance.

Figure 5B:
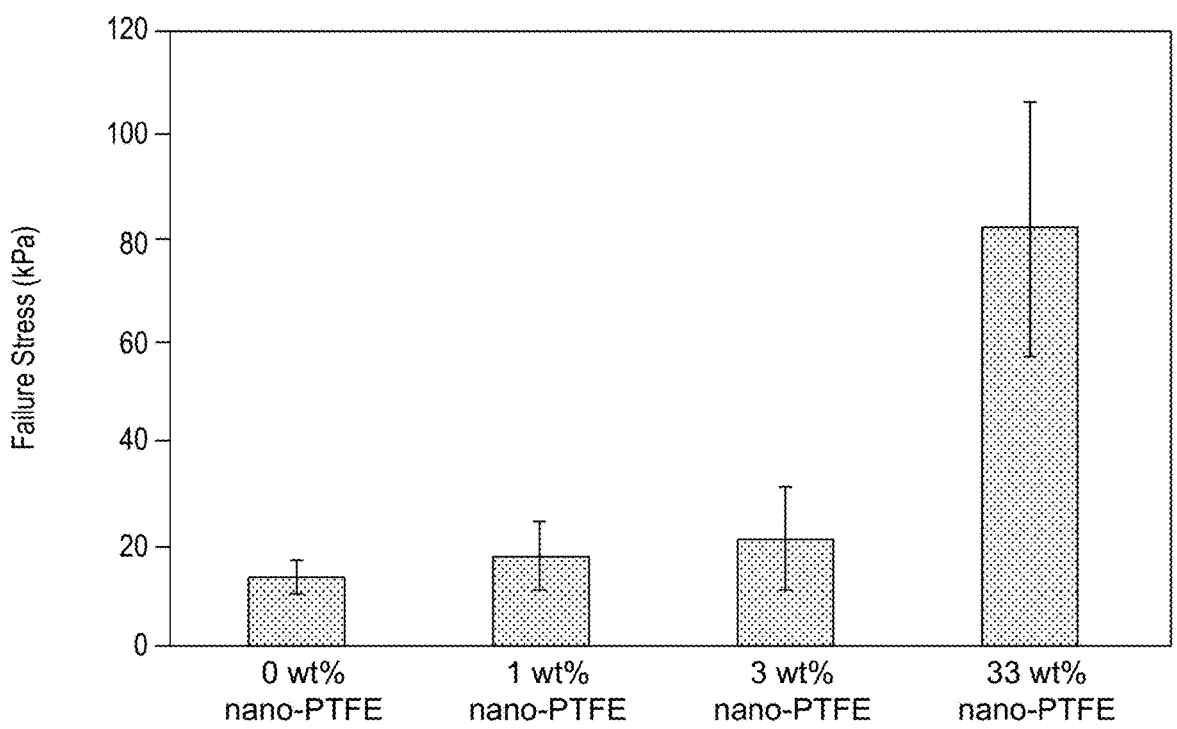
FIG. 5B shows ice adhesion failure stresses for ice-phobic coatings utilizing varying amounts of filler particles according to embodiments of the present disclosure.

FIG. 5B shows ice adhesion failure stresses for ice-phobic coatings utilizing varying amounts of filler particles according to embodiments of the present disclosure. The coatings were based on the formulation of Sample 5 including nano-PTFE at different loading amounts (0 wt %, 1 wt %, 3 wt %, and 33 wt %). A thickness of each coating was 25 μm. While low loading levels demonstrated low ice adhesion, higher loading (33 wt %) appeared to have an adverse effect on adhesion resistance.

Figure 5C:
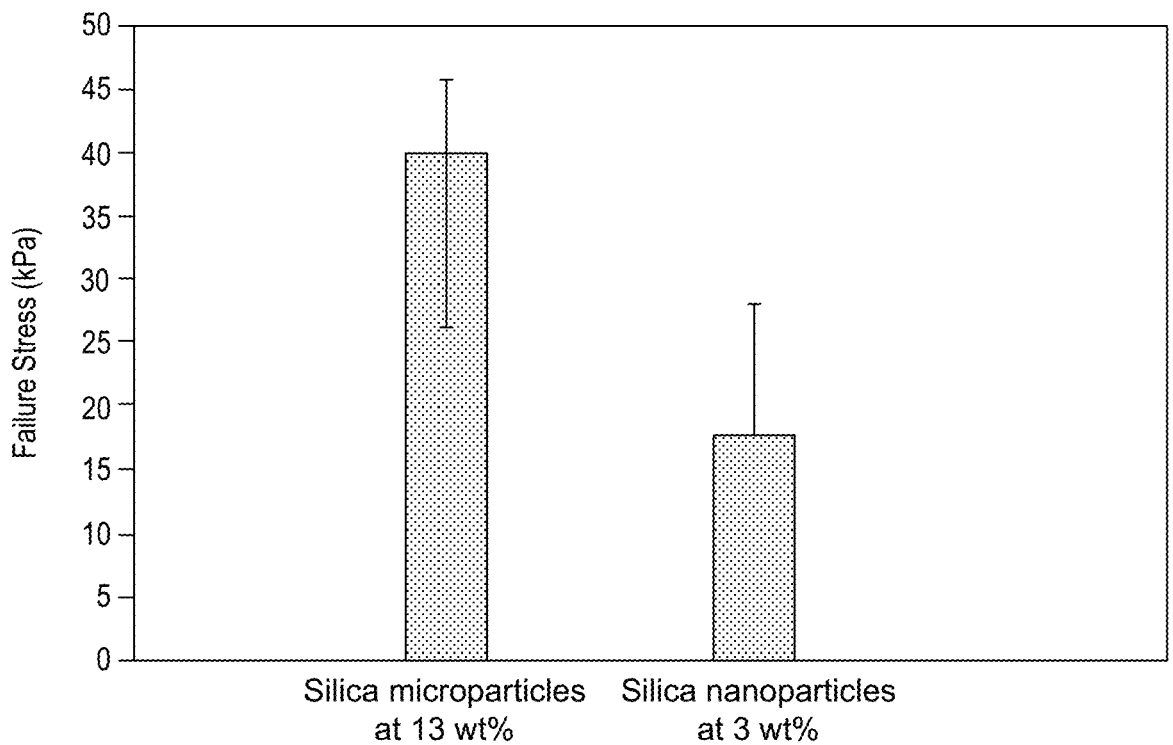
FIG. 5C shows ice adhesion failure stresses for ice-phobic coatings utilizing different levels of silica fillers according to embodiments of the present disclosure.

FIG. 5C shows ice adhesion failure stresses for ice-phobic coatings utilizing different levels of silica fillers according to embodiments of the present disclosure. A coating based on the formulation of Sample 4 having fumed silica at 13 wt % loading was compared against a coating based on the formulation of Sample 5 having silica nanoparticles at 3 wt % loading. While the loading amounts differed, it was expected that 3 wt % loading with silica nanoparticles would yield a comparable set of physical performances otherwise. Lower ice adhesion was observed with the lower loading of silica nanoparticles.

Figure 5D:
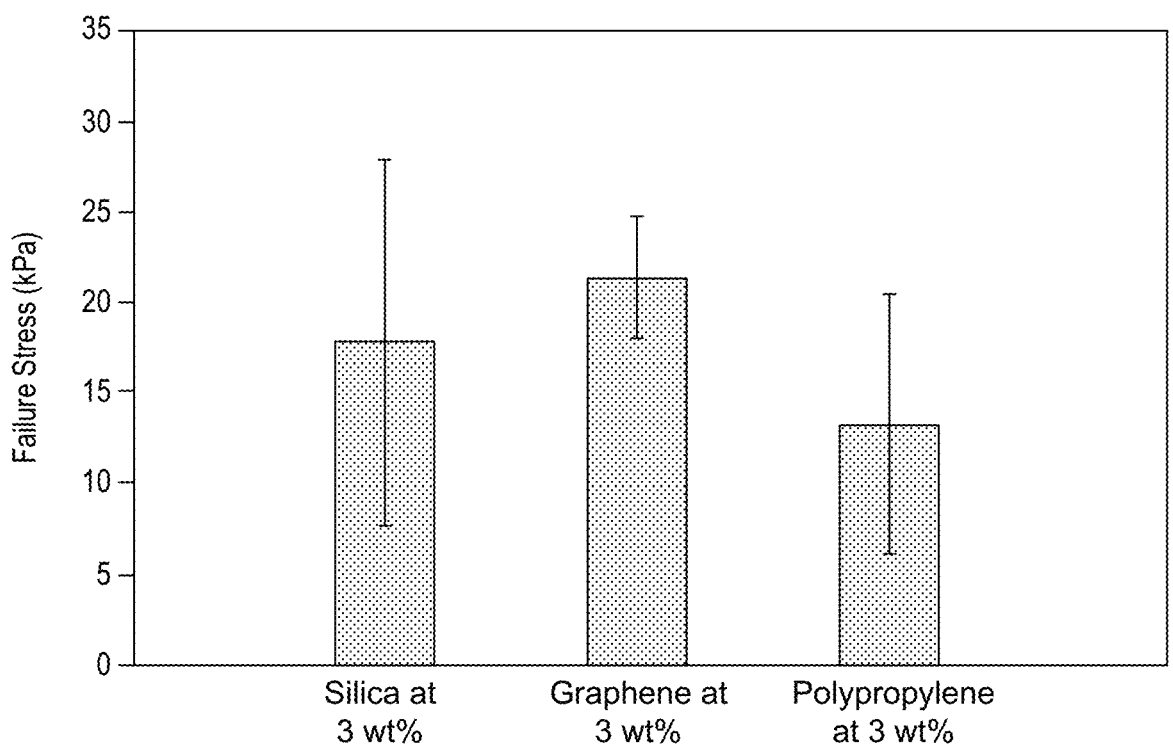
FIG. 5D shows ice adhesion failure stresses for ice-phobic coatings utilizing different types of filler nanoparticles according to embodiments of the present disclosure.

FIG. 5D shows ice adhesion failure stresses for ice-phobic coatings utilizing different types of filler nanoparticles according to embodiments of the present disclosure. The coatings were produced based on the formulation of Sample 5 having different filler particles each at a total loading of 3 wt %, with silica nanoparticles (with average sizes ranging from 10 nm to 50 nm), grapheme (xGnP® C-500), and polypropylene microparticles (MICROPRO 400) used as the filler particles. A thickness of each coating was 25 μm. Each coating displayed comparable and relatively low levels of ice adhesion.

Figure 5E:
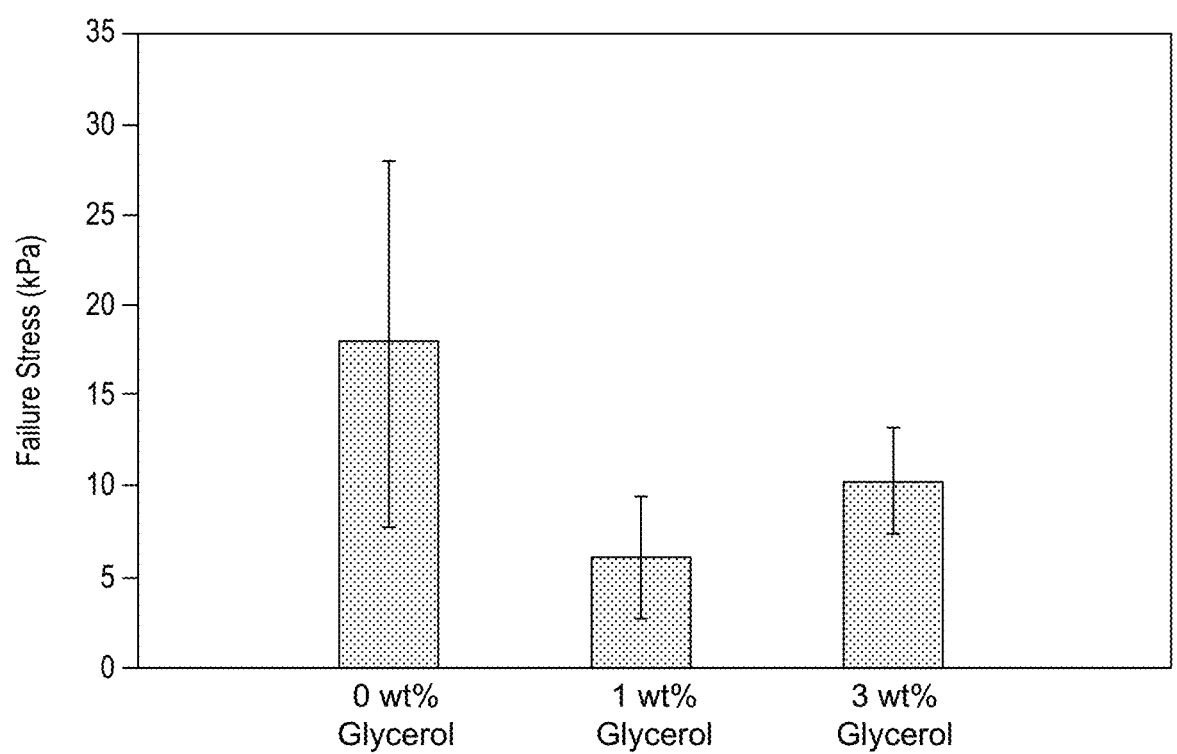
FIG. 5E shows ice adhesion failure stresses for ice-phobic coatings utilizing different amounts of glycerol as a cryoprotectant according to embodiments of the present disclosure.

FIG. 5E shows ice adhesion failure stresses for ice-phobic coatings utilizing different amounts of glycerol as a cryoprotectant according to embodiments of the present disclosure. The coatings were produced based on the formulation of Sample 5 at different loadings of glycerol (0 wt %, 1 wt %, and 3 wt % glycerol) with a constant loading of silica nanoparticles (at 3 wt %). A thickness of each coating was 25 μm. It is observed from FIG. 5E that the presence of a relatively small amount of cryoprotectant can significantly reduce ice adhesion failure stress (e.g., by a factor of two to three). It is noted that other cryoprotectants may yield similar results, and thus the embodiments herein are not limited to glycerol.

EXAMPLE 5

Erosion Resistance of Coatings

Erosion resistance methodologies were adapted from ASTM G76-13, "Standard Test Method for Conducting Erosion Tests by Solid Particle Impingement Using Gas Jets". An erosion test apparatus included a Problast system (VANIMAN MANUFACTURING CO.) fitted with air flow in-take at a desired pressure at ambient temperature, and a reservoir for holding the grit powder of aluminum oxide of 50 Micron/220 grit. A nozzle diameter was 1.6 mm and a distance of the nozzle from the sample surface (coating on an aluminum coupon) was 10 mm±1 mm at an angle of 90° from the sample surface. Test durations of grit blasting were kept at 30, 60, 90, and 120 seconds. The weight loss of the coupons was found to be inconsistent, as the grit material was embedded in the aluminum and the coating upon impact. Therefore erosion was qualitatively measured by taking optical images of the coated surfaces of the coupons at varying times of exposure upon grit blasting.

Figure 6A:
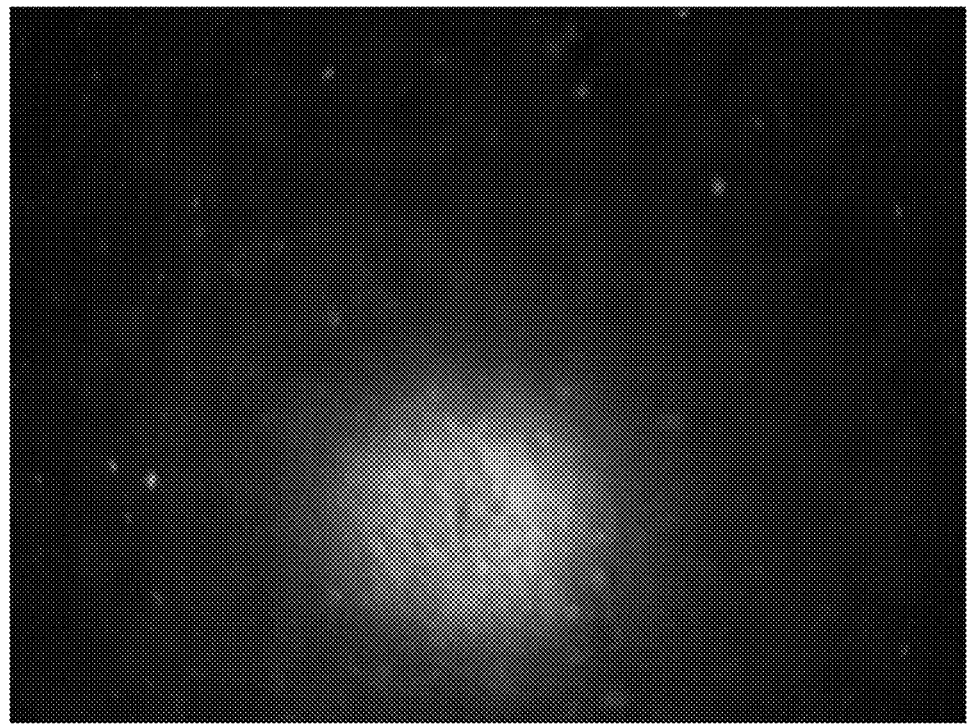
FIG. 6A is an optical micrograph of a coating before erosion.
Figure 6B:
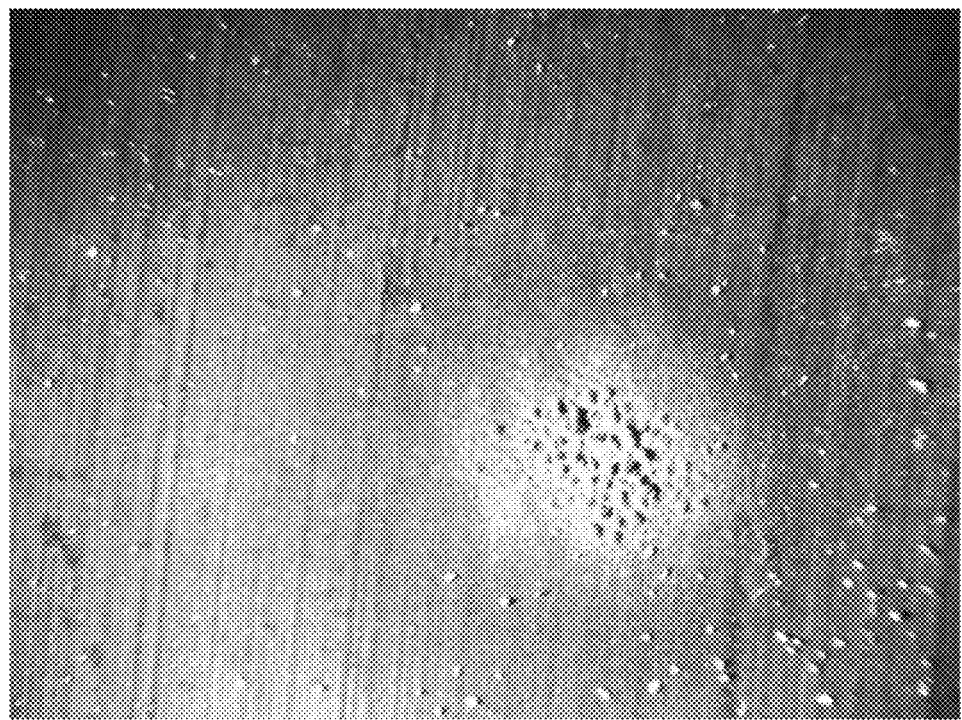
FIG. 6B is an optical micrograph of a coating with partial erosion.
Figure 6C:
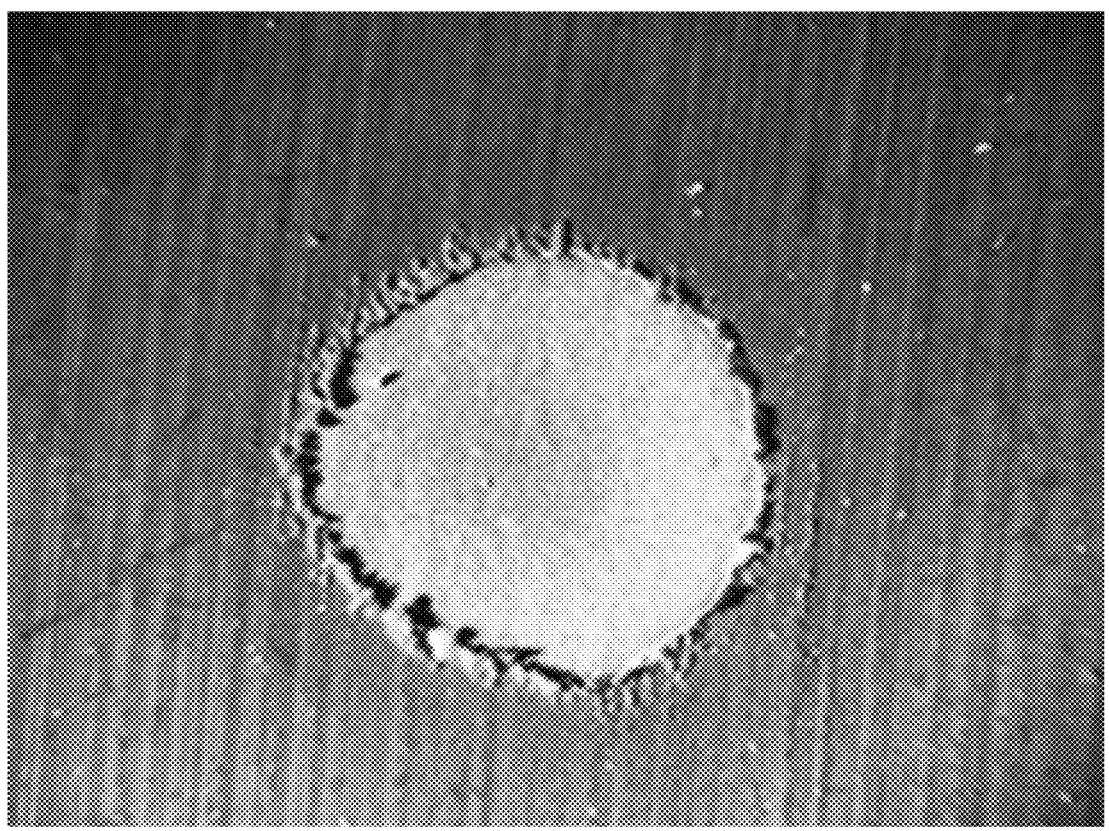
FIG. 6C is an optical micrograph of a coating with full erosion.

FIGS. 6A-6C are optical micrographs of varying degrees of erosion of a coating based on Sample 1. A thickness of the coating was 125 μm. FIG. 6A shows the coating with no erosion (prior to grit exposure). FIG. 6B shows the coating with partial erosion, with some aluminum oxide grit particles being embedded in the coating. FIG. 6C shows the coating with full erosion, with the underlying aluminum coupon being visible.

Table 5 summarizes erosion resistance test results for coatings prepared from a tin-catalyzed silanol-silane system based on a VOC solvent and containing silica nanoparticles (Sample 9). Three different coatings were formed on aluminum coupons and had varying thicknesses. Erosion testing was performed as described above.

TABLE 5

| Erosion resistance results for Sample 9 | | | | |
|---|---|---|---|---|
| Target Thickness of Coating (mil) | | 1 | 3 | 10 |
| Actual Measured Thickness (mil) | | 1.80 ± 0.32 | 3.10 ± 0.52 | 9.50 ± 0.36 |
| % Erosion | @ 30 seconds | 100% | 52% | 16% |
| | @ 60 seconds | 100% | 93% | 57% |
| | @ 90 seconds | 100% | 74% | 67% |

Table 6 summarizes erosion resistance and ice adhesion failure test results for coatings prepared from a tin-catalyzed silanol-silane system based on a VOC solvent and containing silica nanoparticles (Sample 10). Three different coatings were formed on aluminum coupons and had target thickness of 5 mil (with actual thicknesses of 5.4, 5.9, and 7.6 mil). Erosion testing was performed as described above.

TABLE 6

| Ice adhesion failure and erosion resistance results for Sample 10 | | |
|---|---|---|
| Ice Adhesion Failure Stress @ 1 Mil Thickness (kPa) | Grit Blast Time | Erosion |
| 66 ± 15 | @ 30 seconds | 30 ± 34% |
| | @ 60 seconds | 36 ± 11% |
| | @ 90 seconds | 37 ± 10% |

Table 7 summarizes erosion resistance and ice adhesion failure test results for coatings prepared from a tin-catalyzed silanol-hydride (methyl hydrogen cross-linker with 45% Si—H groups) system based on a VOC solvent and without filler particles (Sample 11). Three different coatings were formed on aluminum coupons and had target thickness of 10 mil (with actual thicknesses of 9.1, 13.3, and 10.3 mil). Erosion testing was performed as described above.

TABLE 7

| Ice adhesion failure and erosion resistance results for Sample 11 | | |
|---|---|---|
| Ice Adhesion Failure Stress @ 1 Mil Thickness (kPa) | Grit Blast Time | Erosion |
| 45 ± 6 | @ 30 seconds | 9 ± 3% |
| | @ 60 seconds | 18 ± 5% |
| | @ 90 seconds | 18 ± 7% |

The results of Table 5 indicate that 1 mil thickness is ineffective against erosion resistance for any exposure time to grit blasting. Table 7 demonstrates erosion resistance results for Sample 11 that are superior to those of Samples 9 and 10, as shown in Tables 5 and 6, respectively. Moreover, Sample 11, which was filler free, also demonstrated superior ice adhesion resistance over Sample 10.

Figure 7:
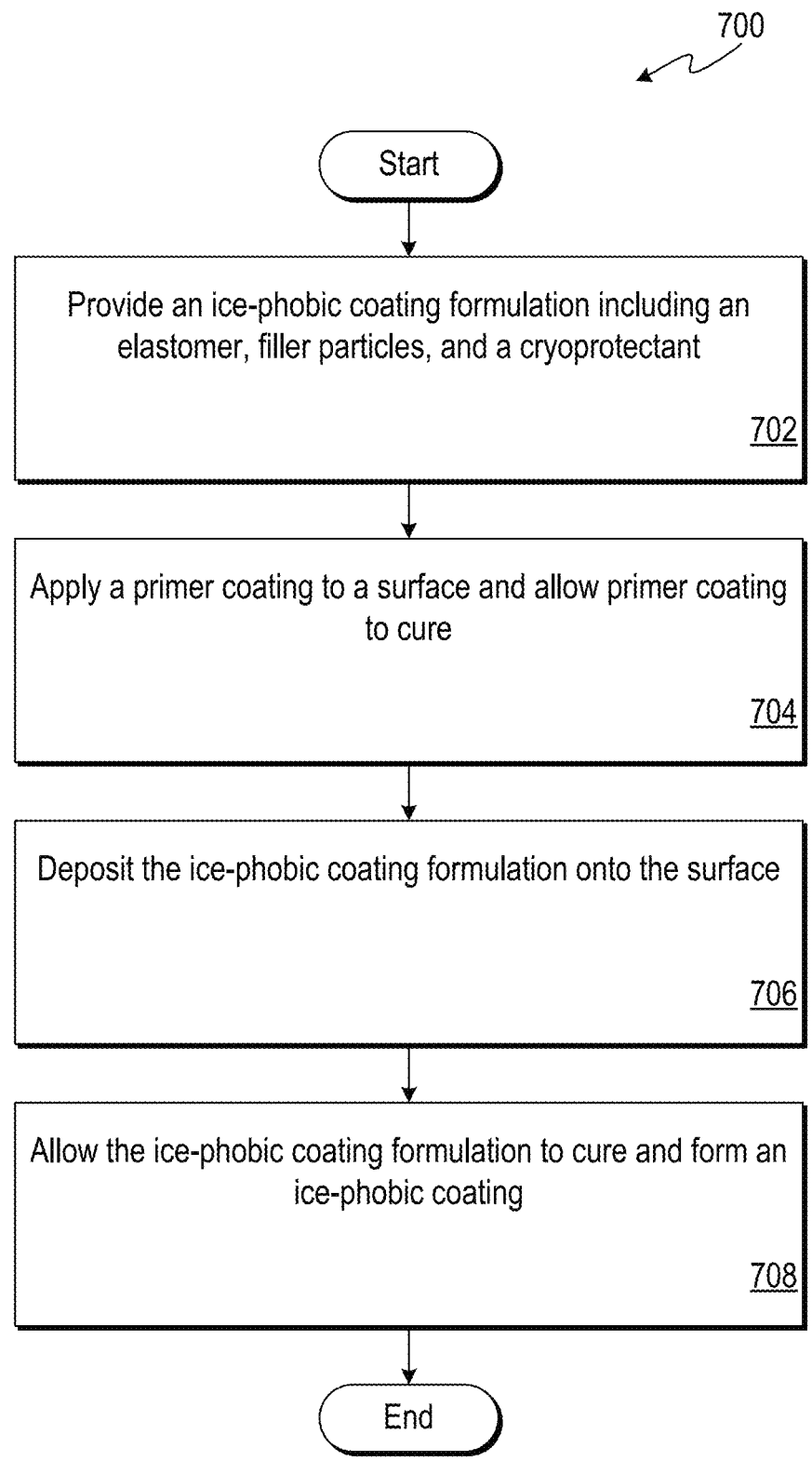
FIG. 7 is a block diagram illustrating a method for preparing an ice-phobic coating in accordance with an embodiment of the disclosure.

FIG. 7 is a block diagram illustrating a method 700 for preparing an ice-phobic coating in accordance with an embodiment of the disclosure. At block 702, an ice-phobic coating formulation is provided, the formulation including an elastomer, filler particles, and a cryoprotectant. The components of the formulation may correspond to any of the examples described herein, including combinations and variations thereof.

At block 704, a primer coating is applied to a surface and allowed to cure. At block 706, the ice-phobic coating formulation is deposited onto the surface (e.g., with the primer coating serving as an intermediate layer between the ice-phobic coating formulation and the surface). In some embodiments, the ice-phobic coating formulation is deposited directly onto the surface (e.g., block 704 is omitted). At block 708, the ice-phobic coating is allowed to cure and form an ice-phobic coating. In some embodiments, the ice-phobic coating formulation is solventless, and is a condensation cure system, an addition cure system, or a UV cure system. In some embodiments, the ice-phobic coating formulation is solvent-based (e.g., VOC solvent, non-VOC solvent, or combinations thereof).

Further Embodiments

The following examples pertain to further embodiments. In one aspect of the present disclosure, a curable coating formulation comprises a siloxane component at a first concentration, a silanol component at a second concentration, a silane component at a third concentration, and a catalyst component at a fourth concentration.

In another aspect of the present disclosure, a curable coating formulation comprises a siloxane component at a first concentration, a vinyl-siloxane component at a second concentration, a hydride-siloxane component at a third concentration, and a catalyst component at a fourth concentration.

In yet another aspect of the present disclosure, a curable coating formulation comprises a first component at a first concentration, the first component comprising siloxane, a second component at a second concentration, the second component comprising silanol or vinyl-siloxane, a third component at a third concentration, the third component comprising silane or hydride-siloxane, and a fourth component at a fourth concentration, the fourth component comprising a catalyst.

In one embodiment, the siloxane of the first component comprises PDMS.

In one embodiment, the second component comprises silanol and the third component comprises hydride-siloxane, and wherein the fourth component comprises a tin catalyst.

In one embodiment, the formulation further comprises filler particles. In one embodiment, the filler particles comprise one or more of indium tin oxide particles, silica particles, or graphite.

In one embodiment, the coating formulation is an ice-phobic coating formulation. In one embodiment, the ice-phobic coating formulation is adapted to form an ice-phobic coating having an ice adhesion failure stress ranging from 1 kPa to 20 kPa.

In another aspect of the present disclosure, a method comprises spraying the aforementioned solventless curable coating formulation onto a surface.

In yet another aspect of the present disclosure, a method comprises producing a mold by casting or liquid injection molding the aforementioned solventless curable coating formulation.

In yet another aspect of the present disclosure, a method comprises mixing a siloxane component, a silanol component, and a silane component to form a mixture, and adding a catalyst component to the mixture. The method further comprises heating the mixture.

In yet another aspect of the present disclosure, a method comprises mixing a first volume with a second volume to produce a third volume, wherein the first volume comprises a vinyl-siloxane component, and wherein the second volume comprises a hydride-siloxane component, a siloxane component, and a catalyst component, wherein an amount of the siloxane component is selected to adjust concentrations of each of the vinyl-siloxane component, the hydride-siloxane component, and the catalyst component.

In yet another aspect of the disclosure, an ice-phobic coating formulation comprises an elastomer, filler particles, and a cryoprotectant. In one embodiment, the formulation is a solventless curable coating formulation. In one embodiment, a viscosity of the solventless curable coating formulation ranges from 750 cSt to 1,500 cSt, or from 800 cSt to 1,100 cSt.

In one embodiment, the elastomer comprises one or more of fluoro-elastomer, fluoro-silicone, or silicone.

In one embodiment, the filler particles comprise one or more of silica nanoparticles, silica microparticles, polypropylene, polytetrafluoroethylene (PTFE), graphene, calcium carbonate, or titanium dioxide. In one embodiment, the filler particles have an average surface area ranging from 6 $m^2/g$ to 8 $m^2/g$.

In one embodiment, the filler particles comprise fumed silica. In one embodiment, the fumed silica was previously treated with dimethyl-dichlorosilane.

In one embodiment, the filler particles comprise silica nanoparticles. In one embodiment, the silica nanoparticles have an average size ranging from 10 nm to 50 nm, or from 15 nm to 20 nm. In one embodiment, a weight percent of the silica nanoparticles in the formulation is less than 5 wt %, is less than 4 wt %, ranges from 1 wt % to 5 wt %, or ranges from 2 wt % to 4 wt %. In one embodiment, the silica nanoparticles are present in aggregates having an average size greater than 500 nm, or ranging from 100 nm to 300 nm.

In one embodiment, the filler particles comprise polypropylene microparticles. In one embodiment, the polypropylene microparticles have an average size ranging from 3 micrometers to 10 micrometers.

In one embodiment, the filler particles comprise PTFE nanoparticles. In one embodiment, the PTFE nanoparticles have an average size ranging from 100 nm to 300 nm.

In one embodiment, the filler particles comprise graphene. In one embodiment, the graphene has an average thickness ranging from 1 nm to 5 nm. In one embodiment, the graphene has an average surface area ranging from 300 $m^2/g$ to 750 $m^2/g$.

In one embodiment, the filler particles comprise titanium oxide. In one embodiment, a weight percent of the titanium oxide in the formulation is greater than 0 wt % and less than 1 wt %.

In one embodiment, the cryoprotectant comprises one or more of glycerol, trehalose, dimethylsulfoxide (DMSO), or polyvinyl alcohol (PVA).

In one embodiment, the cryoprotectant comprises glycerol at a weight percent in the formulation ranging from 1 wt % to 3 wt %.

In yet another aspect of the present disclosure, a method for forming an ice-phobic coating comprises providing an ice-phobic coating formulation, the ice-phobic coating formulation comprising an elastomer, filler particles, and a cryoprotectant. The method further comprises depositing the ice-phobic coating formulation onto a surface, wherein the ice-phobic coating formulation forms the ice-phobic coating upon curing.

In one embodiment, depositing the ice-phobic coating formulation comprises spraying the ice-phobic coating formulation onto the surface.

In one embodiment, the ice-phobic coating formulation has a viscosity ranging from 750 cSt to 1,500 cSt, or from 800 cSt to 1,100 cSt.

In one embodiment, the method further comprises applying a primer coating to the surface, wherein the ice-phobic coating formulation is deposited onto the surface after the primer coating is cured. In one embodiment, the primer coating is a silane-based primer coating. In one embodiment, the primer coating is moisture cured.

In one embodiment, a thickness of the ice-phobic coating is less than 100 micrometers, ranges from 10 micrometers to 40 micrometers, ranges from 115 micrometers to 300 micrometers, or is greater than or equal to 100 micrometers.

In one embodiment, the ice-phobic coating has an average failure stress ranging from 5 kPa to 20 kPa as measurable using an ice-pin test.

In yet another aspect of the present disclosure, an ice-phobic coating formulation comprising silicone and glycerol at a weight percent in the formulation ranging from 1 wt % to 3 wt %. In one embodiment, the ice-phobic coating formulation is solventless. In one embodiment, the formulation is substantially free of nanoparticles or nanoparticles.

In one embodiment, the formulation comprises silica nanoparticles at a weight percent in the formulation ranging from 1 wt % to 5 wt %. In one embodiment, the ice-phobic coating formulation is adapted to form an ice-phobic coating having an average ice-adhesion failure stress ranging from 1 kPa to 20 kPa, as measurable using an ice-pin test.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment, and such references mean "at least one".

Whereas many alterations and modifications of the present invention will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite those features regarded as the invention.

What is claimed is:

1. An ice-phobic coating formed by curing a solventless coating formulation comprising:
    an elastomer;
    nanoparticles present in an amount from 1 wt % to 5 wt % based on a total weight of the solventless coating formulation; and
    a cryoprotectant present in an amount from 1 wt % to 3 wt % based on the total weight of the solventless coating formulation.

2. The coating of claim 1, wherein a viscosity of the solventless coating formulation is from 750 cSt to 1,500 cSt.

3. The coating of claim 1, wherein the elastomer comprises one or more of fluoro-elastomer, fluoro-silicone, or silicone.

4. The coating of claim 1, wherein the nanoparticles comprise one or more of silica, polytetrafluoroethylene (PTFE), polypropylene, graphene, calcium carbonate, or titanium dioxide.

5. The coating of claim 1, wherein the nanoparticles comprise silica nanoparticles having an average size from 10 nm to 50 nm.

6. The coating of claim 1, wherein the cryoprotectant comprises one or more of glycerol, trehalose, dimethylsulfoxide (DMSO), or polyvinyl alcohol (PVA).

7. The coating of claim 1, wherein an ice adhesion failure stress of the coating is from 1 kPa to 20 kPa.

8. An ice-phobic coating formulation comprising:
    an elastomer;
    PTFE nanoparticles present from 1 wt % to 5 wt % based on a total weight of the formulation; and
    a cryoprotectant present in an amount from 1 wt % to 3 wt % based on the total weight of the formulation.

9. The formulation of claim 8, wherein the formulation is a solventless curable coating formulation.

10. The formulation of claim 9, wherein a viscosity of the solventless curable coating formulation is from 750 cSt to 1,500 cSt.

11. The formulation of claim 8, wherein the elastomer comprises one or more of fluoro-elastomer, fluoro-silicone, or silicone.

12. The formulation of claim 8, wherein the PTFE nanoparticles have an average size from 100 nm to 300 nm.

13. The formulation of claim 8, wherein the cryoprotectant comprises one or more of glycerol, trehalose, DMSO, or PVA.

14. A method of forming an ice-phobic coating, the method comprising: spraying a formulation onto a surface, the formulation comprising:
    an elastomer;
    nanoparticles present in an amount from 1 wt % to 5 wt % based on a total weight of the formulation; and
    glycerol present in an amount from 1 wt % to 3 wt % based on the total weight of the formulation; and
allowing the formulation to cure to form the ice-phobic coating.

15. The method of claim 14, further comprising:
    depositing a silane-based primer layer onto the surface prior to depositing the formulation.

16. The method of claim 14, wherein the nanoparticles comprise one or more of silica, polytetrafluoroethylene (PTFE), polypropylene, graphene, calcium carbonate, or titanium dioxide.

17. The method of claim 14, wherein the nanoparticles comprise PTFE nanoparticles, and wherein the PTFE nanoparticles have an average size ranging from 100 nm to 300 nm.

18. The method of claim 14, wherein an ice adhesion failure stress of the coating is from 1 kPa to 20 kPa.

* * * * *